US012770579B2

(12) United States Patent
Yun

(10) Patent No.: US 12,770,579 B2
(45) Date of Patent: Oct. 20, 2026

(54) SUBPIXEL WITH TRANSISTORS THAT CONTROL VOLTAGE STATE OF ELECTRODE OF LIGHT EMITTING DEVICE

(71) Applicant: LG Display Co., Ltd., Seoul (KR)

(72) Inventor: JaeKyeong Yun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/188,519

(22) Filed: Apr. 24, 2025

(65) Prior Publication Data

US 2026/0134841 A1 May 14, 2026

(30) Foreign Application Priority Data

Nov. 8, 2024 (KR) ........................ 10-2024-0157764

(51) Int. Cl.
*G09G 3/3291* (2016.01)
*G09G 3/32* (2016.01)
*G09G 3/3266* (2016.01)

(52) U.S. Cl.
CPC ............ *G09G 3/3291* (2013.01); *G09G 3/32* (2013.01); *G09G 3/3266* (2013.01); *G09G 2300/043* (2013.01); *G09G 2300/0842* (2013.01); *G09G 2310/0267* (2013.01); *G09G 2310/0275* (2013.01); *G09G 2310/08* (2013.01); *G09G 2330/021* (2013.01)

(58) Field of Classification Search
CPC .................................................... G09G 3/3291
See application file for complete search history.

(56) References Cited

U.S. PATENT DOCUMENTS

2021/0158489 A1* 5/2021 Watanabe ................ G09G 3/32
2021/0375192 A1* 12/2021 Jeon .......................... G09G 3/32
2024/0169539 A1* 5/2024 Yamazaki ............. A61B 5/163

FOREIGN PATENT DOCUMENTS

KR 10-2017-0081054 A 7/2017
KR 10-2544046 B1 6/2023

* cited by examiner

*Primary Examiner* — Chun-Nan Lin
(74) *Attorney, Agent, or Firm* — Fenwick & West LLP

(57) ABSTRACT

A display device includes a subpixel that emits light based on data voltage. The subpixel may include a light emitting device including a first electrode, an intermediate layer, and a second electrode, a driving transistor controlling a connection between a second node and a third node according to a voltage applied to a first node, a first transistor controlling a connection between the second node and a data line supplied with the data voltage according to a scan signal applied to a first gate node, a storage capacitor electrically connected between the first node and the second node, and a second transistor connected between a fourth node and the second electrode, and turned on or off according to a gate voltage applied to a second gate node.

18 Claims, 14 Drawing Sheets

S11

SUBPIXEL WITH TRANSISTORS THAT CONTROL VOLTAGE STATE OF ELECTRODE OF LIGHT EMITTING DEVICE

CROSS REFERENCE TO RELATED APPLICATION

This application claims priority from Republic of Korea Patent Application No. 10-2024-0157764, filed on Nov. 8, 2024, which is hereby incorporated by reference in its entirety.

TECHNICAL FIELD

Embodiments of the present disclosure relate to a subpixel and a display device with the same.

BACKGROUND

As the information society develops, the demand for display devices for displaying images is increasing in various forms, and recently, various types of display devices such as liquid crystal displays and organic light-emitting displays are being utilized.

SUMMARY

Embodiments of the present disclosure may provide a subpixel and a display device capable of controlling the voltage state of a second electrode of a light emitting device.

Embodiments of the present disclosure may provide a subpixel and a display device capable of preventing or at least reducing image quality degradation due to a change in the characteristics of a driving transistor (e.g. threshold voltage, mobility, etc.).

Embodiments of the present disclosure may provide a subpixel and a display device capable of minimizing or at least reducing the degradation of image quality due to body effect phenomenon in a driving transistor.

Embodiments of the present disclosure may provide a subpixel and a display device capable of supplying a reference voltage to a gate node of a driving transistor and a data voltage to a source node of the driving transistor.

Embodiments of the present disclosure may provide a subpixel and a display device capable of maintaining the voltage at a source node of a driving transistor while emitting light.

Embodiments of the present disclosure may provide a new concept of subpixel capable of effectively preventing the body effect phenomenon caused by a source node fluctuation of a driving transistor, and a display device including the subpixel.

Embodiments of the present disclosure may provide a display device including a subpixel that emits light based on data voltage. The subpixel may include a light emitting device including a first electrode, an intermediate layer, and a second electrode, a driving transistor controlling a connection between a second node and a third node according to a voltage applied to a first node, a first transistor controlling a connection between the second node and a data line supplied with the data voltage according to a scan signal applied to a first gate node, a storage capacitor electrically connected between the first node and the second node, and a second transistor connected between a fourth node and the second electrode, and turned on or off according to a gate voltage applied to a second gate node.

Embodiments of the present disclosure may provide a subpixel including a light emitting device including a first electrode, an intermediate layer, and a second electrode, a driving transistor controlling a connection between a second node and a third node according to a voltage applied to a first node, a first transistor controlling a connection between a data line to which the data voltage is provided and the second node according to a scan signal applied to a first gate node, a storage capacitor electrically connected between the first node and the second node, and a second transistor connected between a fourth node and the second electrode, and turned on or off according to a gate voltage applied to a second gate node.

According to embodiments of the present disclosure, it is possible to provide a subpixel and a display device capable of controlling the voltage state of a second electrode of a light emitting device.

According to embodiments of the present disclosure, it is possible to provide a subpixel and a display device capable of preventing or at least reducing image quality degradation due to a change in the characteristics of a driving transistor (e.g. threshold voltage, mobility, etc.).

According to embodiments of the present disclosure, it is possible to provide a subpixel and a display device capable of minimizing or at least reducing the degradation of image quality due to body effect phenomenon in a driving transistor.

According to embodiments of the present disclosure, it is possible to provide a subpixel and a display device capable of supplying a reference voltage to a gate node of a driving transistor and a data voltage to a source node of the driving transistor.

According to embodiments of the present disclosure, it is possible to provide a subpixel and a display device capable of maintaining the voltage at a source node of a driving transistor while emitting light, thereby controlling the body effect phenomenon.

According to embodiments of the present disclosure, it is possible to effectively drive a subpixel with low power consumption by effectively controlling the body effect phenomenon in a driving transistor.

DETAILED DESCRIPTION

Figure 1:
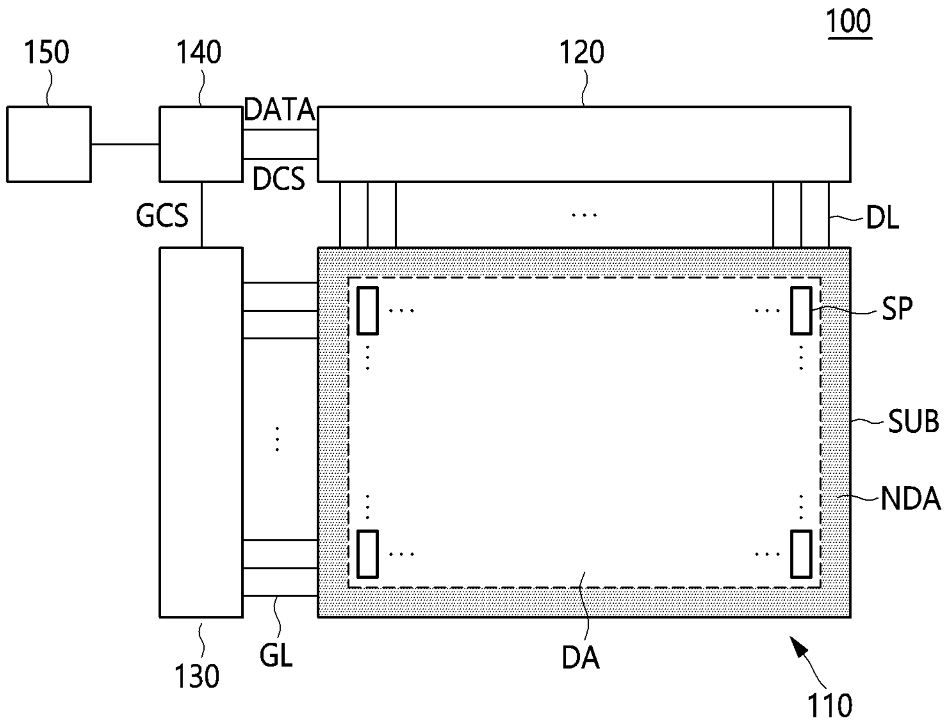
FIG. 1 is a system configuration diagram of a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, it will be described various embodiments of the disclosure in detail with reference to the accompanying drawings.

FIG. 1 is a system configuration diagram of a display device 100 according to embodiments of the present disclosure.

Referring to FIG. 1, a display device 100 according to embodiments of the present disclosure may include, as components for displaying images, a display panel 110 and a display driving circuit. The display driving circuit may be a circuit for driving the display panel 110. The display driving circuit may include a data driving circuit 120, a gate driving circuit 130, and a controller 140, but the embodiments of the present disclosure are not limited thereto.

The display panel 110 may include a substrate SUB and a plurality of subpixels SP arranged on the substrate SUB.

The substrate SUB may include a display area DA and a non-display area NDA.

The display area DA is an area where an image can be displayed and may also be referred to as an active area. A plurality of subpixels SP for image display may be disposed in the display area DA.

The non-display area NDA is an area where an image cannot be displayed, and may be an outer area of the display area DA. The non-display area NDA may also be referred to as a bezel (or bezel area). The non-display area NDA may include a pad area.

Among the first to fourth non-display areas, a fourth non-display area may include a pad area where a driving circuit is connected or bonded (or joined).

For another example, a boundary area between the display area DA and the non-display area NDA may be bent, and the non-display area NDA may be located below the display area DA.

When a user looks at the display device 100 from the front, there may be little or no non-display area NDA visible to the user.

For example, the display device 100 according to the embodiments of the present disclosure may be an organic light-emitting display device in which the light emitting device is implemented as an organic light-emitting diode (OLED). For another example, the display device 100 according to the embodiments of the present disclosure may be an inorganic light-emitting display device in which the light emitting device is implemented as an inorganic-based light-emitting diode. For another example, the display device 100 according to the embodiments of the present disclosure may be a quantum dot display device in which the light emitting device is implemented as a quantum dot, which is a semiconductor crystal that emits light by itself. For another example, the display device 100 according to the embodiments of the present disclosure may be a micro LED display device or a mini LED display device.

Various types of signal lines for driving a plurality of subpixels SP may be arranged on the substrate SUB of the display panel 110. For example, the various types of signal lines may include a plurality of data lines DL that transmit data signals (also referred to as data voltages or image signals) and a plurality of gate lines GL that transmit gate signals (also referred to as scan signals).

For example, the plurality of data lines DL and the plurality of gate lines GL may intersect each other. Each of the plurality of data lines DL may be arranged while extending in the column direction and each of the plurality of gate lines GL may be arranged while extending in the row direction. According to the embodiments of the present disclosure, the column direction and the row direction may be relative directions.

The data driving circuit 120 may be a circuit for driving a plurality of data lines DL, and may output data signals (e.g., Data signals) to the plurality of data lines DL.

The data driving circuit 120 may receive image data DATA in digital form from the controller 140, convert the received image data DATA into an analog data signal (or also called data voltage), and output the converted image data to a plurality of data lines DL.

For example, the data driving circuit 120 may be connected to the display panel 110 in a tape automated bonding (TAB) method or connected to the bonding pad of the display panel 110 in a chip-on-glass (COG) or a chip-on-panel (COP) method, or connected to the display panel 110 by a chip on film (COF) method, but is not limited thereto.

The data driving circuit 120 may also be connected to one side (for example, the upper side or the lower side) of the display panel 110. As another example, the data driving circuit 120 may be disposed in the display area DA of the display panel 110.

The gate driving circuit 130 is a circuit for driving a plurality of gate lines GL, and may output gate signals to a plurality of gate lines GL.

The gate driving circuit 130 may receive a first gate voltage corresponding to a turn-on voltage (also referred to as a turn-on level voltage) and a second gate voltage corresponding to a turn-off voltage (also referred to as a turn-off level voltage) along with various gate driving control signals GCS, generate gate signals including a section having the first gate voltage and a section having the second gate voltage for a predetermined period of time (e.g., one frame time), and supply the generated gate signals to a plurality of gate lines GL. As an example, the turn-on level voltage may be a high-level voltage, and the turn-off level voltage may be a low-level voltage. As another example, the turn-on level voltage may be a low-level voltage, and the turn-off level voltage may be a high-level voltage.

In the display device 100 according to the embodiments of the present disclosure, the gate driving circuit 130 may be built into the display panel 110 as a gate-in-panel (GIP) type, but the embodiments of the present disclosure are not limited thereto. In the case that the gate driving circuit 130 is a gate-in-panel type, the gate driving circuit 130 may be formed on the substrate SUB of the display panel 110 during the manufacturing process of the display panel 110.

For example, the gate driving circuit 130 may be disposed in the non-display area NDA of the display panel 110.

In another example, the gate driving circuit 130 may be disposed in the display area DA of the display panel 110.

If the gate driving circuit 130 is disposed in the display area DA of the display panel 110, the gate driving circuit 130 may vertically overlap with the subpixels SP disposed in the display area DA. The gate driving circuit 130 may vertically overlap with the plurality of light emitting devices and the plurality of transistors included in the plurality of subpixels SP disposed in the display area DA. The gate driving circuit 130 may include the plurality of transistors. Each of the plurality of transistors included in the gate driving circuit 130 may include an active layer including a first semiconductor material, and each of the plurality of transistors included in the subpixels SP may include an active layer including a second semiconductor material. As an example, the first semiconductor material and the second semiconductor material may be substantially the same. As another example, the first semiconductor material and the second semiconductor material may be different from each other. For example, the first semiconductor material may be a silicon-based semiconductor material (e.g., Low Temperature Poly Silicone; LTPS), and the second semiconductor material may be an oxide semiconductor material.

The controller 140 may be a device for controlling the data driving circuit 120 and the gate driving circuit 130, and may control the driving timing for a plurality of data lines DL and the driving timing for a plurality of gate lines GL.

The controller 140 may supply a data driving control signal DCS to the data driving circuit 120 to control the data driving circuit 120 and may supply a gate driving control signal GCS to the gate driving circuit 130 to control the gate driving circuit 130.

The controller 140 may receive input image data from a host system 150 and supply image data DATA to the data driving circuit 120 based on the input image data.

The controller 140 may be implemented as a separate component from the data driving circuit 120 or may be implemented as an integrated circuit by being integrated with the data driving circuit 120.

The controller 140 may be implemented as various circuits or electronic components such as an integrated circuit (IC), a field programmable gate array (FPGA), an application specific integrated circuit (ASIC), or a processor, but is not limited thereto.

The controller 140 may be mounted on a printed circuit board or a flexible printed circuit and may be electrically connected to the data driving circuit 120 and the gate driving circuit 130 through the printed circuit board or the flexible printed circuit.

The controller 140 may transmit and receive signals with the data driving circuit 120 according to one or more predefined interfaces. For example, the interface may include, but is not limited to, a low voltage differential signaling (LVDS) interface, an embedded clock point-point interface (EPI), and a serial peripheral interface (SPI).

The display device 100 according to the embodiments of the present disclosure may include a touch sensor and a touch sensing circuit that detects presence or absence of a touch occurred by a touch object such as a finger or a pen or detects a touch position by sensing the touch sensor in order to provide not only an image display function but also a touch sensing function.

The touch sensing circuit may include a touch driving circuit that drives and senses the touch sensor to generate and output touch sensing data, and a touch controller that detects touch occurrence or detects a touch position using the touch sensing data.

The touch sensor may include a plurality of touch electrodes. The touch sensor may further include a plurality of touch lines for electrically connecting the plurality of touch electrodes and the touch driving circuit.

The touch sensor may be located in the form of a touch panel on the outside of the display panel 110 or may be located inside the display panel 110.

If the touch sensor is located inside the display panel 110, the touch sensor may be formed on the substrate SUB together with signal lines and electrodes related to display driving during the manufacturing process of the display panel 110.

The touch driving circuit may supply a touch driving signal to at least one of the plurality of touch electrodes and generate touch sensing data by sensing at least one of the plurality of touch electrodes.

The touch sensing circuit may perform touch sensing in a self-capacitance sensing method or a mutual-capacitance sensing method.

The display device 100 may further include a power supply circuit that supplies various powers to the display driving circuit and/or the touch sensing circuit.

The display device 100 according to the embodiments of the present disclosure may be a mobile terminal such as a smart phone or tablet, or a monitor or television (TV) of various sizes, and is not limited thereto, and may be a display of various types and sizes capable of displaying information or images.

The display device 100 according to the embodiments of the present disclosure may further include an electronic device such as a camera (or image sensor) or a detection sensor. For example, the detection sensor may be a sensor that receives light such as infrared, ultrasonic, or ultraviolet rays to detect an object or a human body, but the embodiments of the present disclosure are not limited thereto.

Hereinafter, it will be described a subpixel SP included in the display device 100 of FIG. 1.

Figure 2:
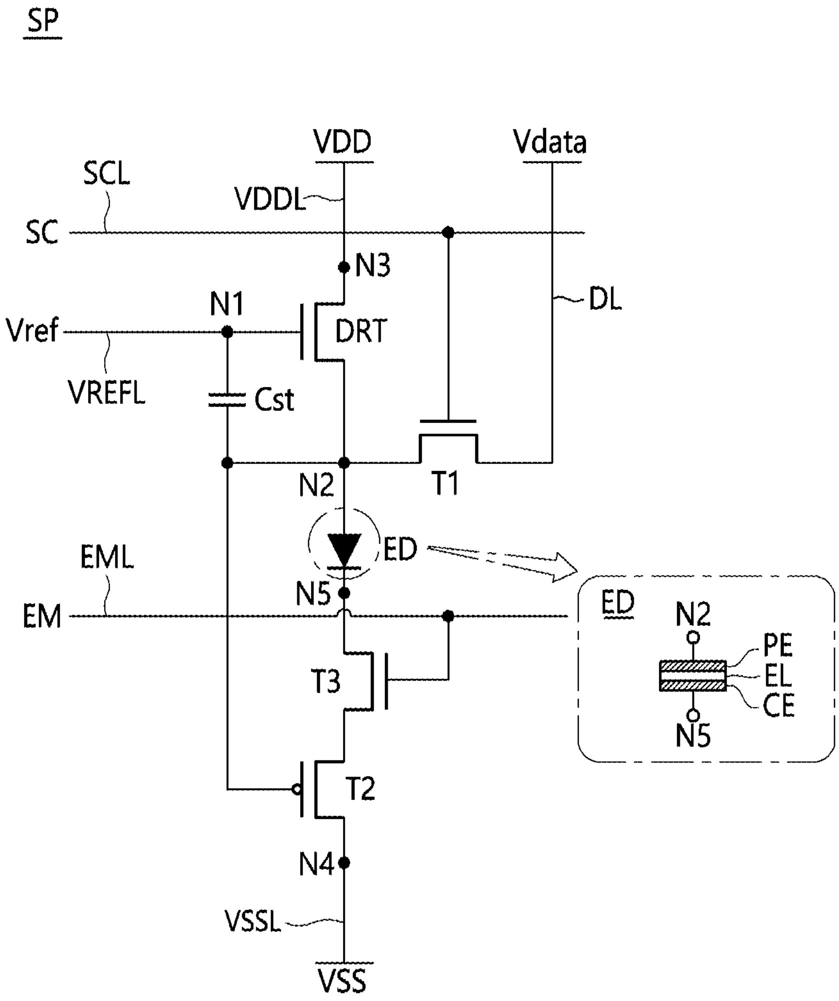
FIG. 2 illustrates a subpixel of a display device according to embodiments of the present disclosure.

FIG. 2 illustrates a subpixel SP of a display device 100 according to embodiments of the present disclosure.

Referring to FIG. 2, the subpixel SP may include a driving transistor DRT, a light emitting device ED, a first transistor T1, a second transistor T2, a third transistor T3, and a storage capacitor Cst.

The light emitting device ED may include a first electrode PE, an emission layer EL, and a second electrode CE.

The first electrode PE of the light emitting device ED may be an anode electrode or a cathode electrode. The second electrode CE may be a cathode electrode or an anode electrode.

For example, the light emitting device ED may be an organic light-emitting diode (OLED), an inorganic-based light-emitting diode (LED), a quantum dot light emitting device, etc.

The driving transistor DRT may be a transistor for supplying a driving current to the light emitting device ED to drive the light emitting device ED. The driving transistor DRT may include a first node N1, a second node N2, and a third node N3.

The first node N1 of the driving transistor DRT may be a node corresponding to a gate node. The first node N1 of the driving transistor DRT may be electrically connected to a reference voltage line VREFL. A constant reference voltage Vref may be applied to the first node N1 of the driving transistor DRT. The second node N2 of the driving transistor DRT may be a source or drain node and may be electrically connected to the source or drain node of the first transistor T1. The second node N2 of the driving transistor DRT may be electrically connected to a first electrode PE of the light emitting device ED. The third node N3 of the driving transistor DRT may be the drain node or the source node of the driving transistor DRT and may be electrically connected to a high-potential driving voltage line VDDL that supplies a high-potential driving voltage VDD. For convenience of explanation, it is exemplified a case in which the second node N2 of the driving transistor DRT is a source node and the third node N3 is a drain node.

Referring to FIG. 2, the first transistor T1 may be a scan transistor. The first transistor T1 may be a transistor for transmitting a data voltage Vdata corresponding to an image signal to the second node N2. The data voltage Vdata may be a voltage lower than the reference voltage Vref. Since the data voltage Vdata is lower than the reference voltage Vref, the difference (e.g., Vgs) between a voltage of the first node N1 and a voltage of the second node N2 may be higher than a threshold voltage of the driving transistor DRT. Since the difference between the voltage of the first node N1 of the driving transistor DRT and the voltage of the second node N2 of the driving transistor DRT is higher than the threshold voltage of the driving transistor DRT, current may be conducted from the third node N3 to the second node N2.

The drain node or the source node of the first transistor T1 may be electrically connected to the corresponding data line DL. The source node or the drain node of the first transistor T1 may be electrically connected to the second node N2 of the driving transistor DRT. The gate node of the first transistor T1 may be electrically connected to a scan signal line SCL to receive the scan signal SC.

The first transistor T1 may be turned on by a scan signal SC of a turn-on level voltage and may be turned off by a scan signal SC of a turn-off level voltage. Here, if the first transistor T1 is an n-type, the turn-on level voltage may be a high-level voltage, and the turn-off level voltage may be a low-level voltage. When the first transistor T1 is a p-type, the turn-on level voltage may be a low-level voltage, and the turn-off level voltage may be a high-level voltage.

If the first transistor T1 is turned on, the data voltage Vdata output from the data line DL may be transferred to the second node N2 of the driving transistor DRT.

The storage capacitor Cst may be connected to the first node N1 of the driving transistor DRT and the second node N2 of the driving transistor DRT. The storage capacitor Cst may maintain the data voltage Vdata corresponding to the image signal voltage or the corresponding signal for one frame time.

One side of the storage capacitor Cst may be electrically connected to the reference voltage line VREFL so that a constant voltage (e.g., a reference voltage Vref) may be applied. According to the capacitive coupling, the voltage of the second node N2 electrically connected to the other side of the storage capacitor may be maintained as the data voltage Vdata supplied from the data line DL. Accordingly, the voltage of the second node N2 may be maintained as the applied data voltage Vdata regardless of the threshold voltage of the driving transistor DRT.

As the voltage of the second node N2 is maintained, it is required a component for controlling the amount of current applied to the light emitting device ED or changing the voltage state of other nodes. Hereinafter, the second transistor T2 is described as a component for controlling the amount of current flowing through the light emitting device ED or changing the voltage state of other nodes.

The second transistor T2 is a transistor with variable resistance and may be connected to the third transistor T3 and a low-potential driving voltage line VSSL. The second transistor T2 may be turned on by a lower gate voltage than the third transistor T3. The channel of the second transistor T2 may have a different width and length from the channel of the third transistor T3.

The drain node or source node of the second transistor T2 may be connected to the third transistor T3. The source node or drain node connected to the low-potential driving voltage line VSSL of the second transistor T2 may be a node corresponding to the fourth node N4, and may be supplied with a low-potential driving voltage VSS.

For convenience of explanation, the fourth node N4 will be explained as a source node as an example.

A gate node of the second transistor T2 may be electrically connected to the second node N2. The second transistor T2 may be turned on or off depending on a voltage applied from the second node N2. As the second transistor T2 is turned on, the second transistor T2 may control a connection between the fourth node N4 and the third transistor T3.

The second transistor T2 may be configured to act as a resistor in the subpixel SP. For example, the second transistor T2 may operate in a linear region. The resistance (or resistance component) of the second transistor T2 may vary depending on the data voltage Vdata applied to the gate node. As the resistance component of the second transistor T2 is changed, the voltage states of the nodes (e.g., the fourth node N4 and the fifth node N5) may be changed. As the voltage state of the nodes change, the light emission (or current) of the subpixel SP can be adjusted.

For example, a grayscale of the image of the subpixel SP may be proportional to the difference between the voltage of the first node N1 and the voltage of the second node N2. Accordingly, since the voltage of the first node N1 is the reference voltage Vref, the higher the data voltage Vdata applied to the second node N2, the lower the grayscale image is displayed. The second transistor T2 may be composed of a P-type transistor, and the data voltage Vdata may be applied to the gate node of the second transistor T2. Since the second transistor is composed of a P-type transistor, the higher the data voltage Vdata, the higher the resistance (or resistance component) of the second transistor T2. As the resistance component of the second transistor T2 increases, the light emission (or current component) of the subpixel SP may decrease.

The voltage and current used in the light emitting device ED may be varied based on the variation of the resistance of the second transistor T2. Images of various states may be displayed according to the variation of the voltage used in the light emitting device ED and the current flowing through the light emitting device ED.

Referring to FIG. 2, the third transistor T3 is a transistor for controlling the light emission of the light emitting device ED, and may be connected to the second transistor T2 and the light emitting device ED. The drain node or source node of the third transistor T3 may correspond to a fifth node N5, and may be connected to the second electrode CE of the light emitting device ED. The source node or drain node of the third transistor T3 may be connected to the drain node or source node of the second transistor T2. For convenience of explanation, the fifth node N5 is explained, as an example, as a drain node of the third transistor T3.

A gate node of the third transistor T3 may be electrically connected to an emission control signal line EML. The gate node of the third transistor T3 may be in a turn-on or turn-off state according to an emission control signal EM applied through the emission control signal line EML.

Each of the driving transistor DRT, the first transistor T1, the second transistor T2, and the third transistor T3 may be an n-type transistor or a p-type transistor. Both the driving transistor DRT and the first transistor T1 may be an n-type transistor or a p-type transistor. At least one of the driving transistor DRT and the first transistor T1 may be an n-type transistor (or a p-type transistor) and the other may be a p-type transistor (or an n-type transistor).

For convenience of explanation, it will be exemplified a case in which the first transistor T1, the third transistor T3, and the driving transistor DRT are n-type transistors, and the second transistor T2 is a p-type transistor.

Hereinafter, it will be described a driving method of the subpixel SP of FIG. 2.

Figure 3:
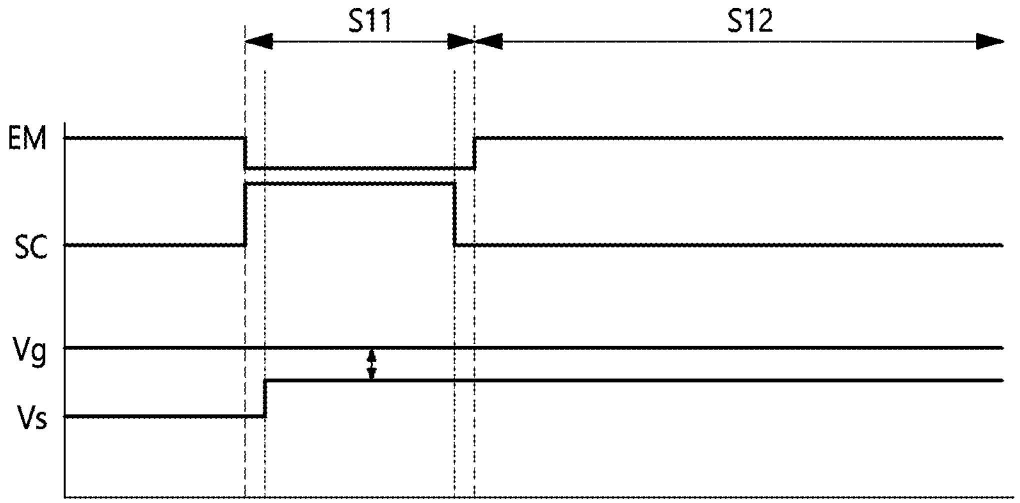
FIG. 3 is a timing diagram for driving a subpixel of a display device according to embodiments of the present disclosure.

FIG. 3 is a timing diagram for driving the subpixel SP of the display device 100 according to the embodiments of the present disclosure.

Referring to FIG. 3, according to a driving method of the display device 100 according to the embodiments of the present disclosure, each driving period of the subpixel SP may include an addressing step (S11) and an emission step (S12). The addressing step (S11) may be referred to as a first driving period. The emission step (S12) may be referred to as a second driving period.

In the display device 100 according to the embodiments of the present disclosure, during the addressing step (S11), the emission control signal EM applied to the emission control signal line EML may have a turn-off level voltage. During the addressing step (S11), the scan signal SC applied to the scan signal line SCL may be a signal of a turn-on level voltage. Alternatively, during the addressing step (S11), the scan signal SC may be changed from the voltage of the turn-on level to the turn-off level voltage after the point in time when a source voltage Vs of the source node of the driving transistor DRT becomes equal to the data voltage Vdata.

During the addressing step (S11), a gate voltage Vg of a gate node of the driving transistor DRT may be equal to a constant reference voltage Vref applied to the reference voltage line VREFL. During the addressing step (S11), the source voltage Vs of the source node of the driving transistor DRT may be applied to the data line DL at a different voltage and may be changed to the data voltage Vdata corresponding to the image signal.

During the addressing step (S11), the state of the image (e.g., grayscale) may be determined by a difference between the gate voltage Vg of the gate node of the driving transistor DRT and the source voltage Vs of the source node of the driving transistor DRT.

Referring to FIG. 3, during the emission step (S12), the emission control signal EM applied to the emission control signal line EML may have a turn-on level voltage. During the emission step (S12), the scan signal SC applied to the scan signal line SCL may have a turn-off level voltage.

Referring to FIG. 3, during the emission step (S12), a constant reference voltage Vref may be applied to the gate node of the driving transistor DRT by the reference voltage line VREFL. For example, the gate voltage Vg (i.e., the voltage of the first node N1) of the gate node of the driving transistor DRT may be equal to the reference voltage Vref applied during the addressing step (S11).

During the emission step (S12), the source voltage Vs (i.e., the voltage of the second node N2) of the source node of the driving transistor DRT may be equal to the data voltage Vdata corresponding to the image signal applied to the data line DL during the addressing step (S11). For example, during the emission step (S12), the voltage of the second node N2 may be maintained for one frame.

Hereinafter, it will be described a driving method for each driving period of a subpixel SP according to an embodiment of the present disclosure.

Figure 4:
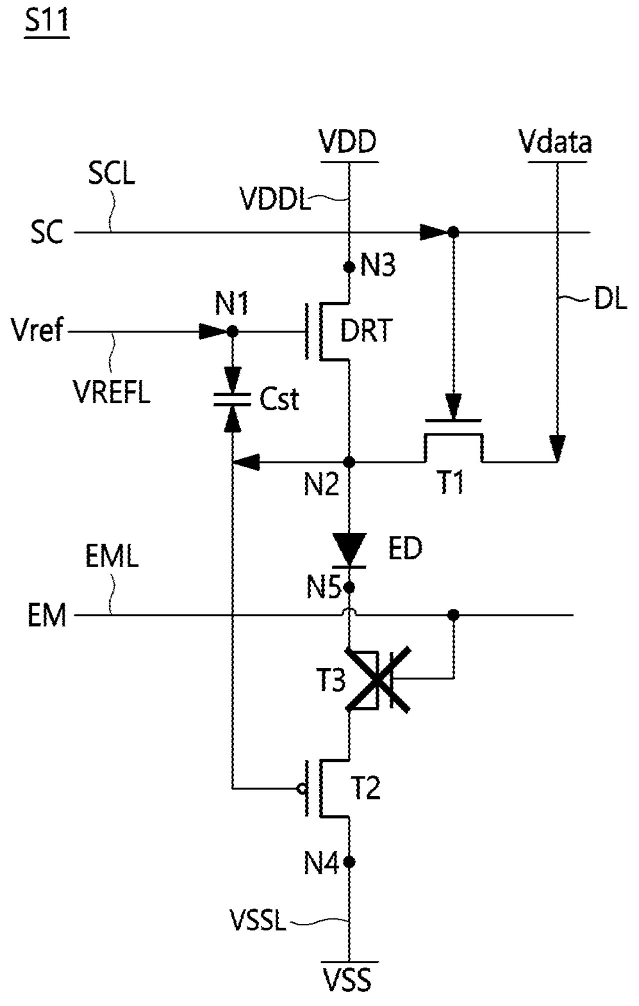
FIG. 4 illustrates an addressing step in a subpixel driving method of a display device according to embodiments of the present disclosure.

FIG. 4 illustrates an addressing step (S11) in a driving method of a subpixel SP of a display device 100 according to embodiments of the present disclosure.

Referring to FIG. 4, during the addressing step (S11), a constant reference voltage Vref may be applied to the reference voltage line VREFL.

During the addressing step (S11), the scan signal SC may have a turn-on level voltage. Accordingly, the first transistor T1 may be in a turn-on state.

During the addressing step (S11), the data voltage Vdata corresponding to the image signal output from the data driving circuit 120 to the data line DL may be applied to the second node N2 of the driving transistor DRT through the first transistor T1 turned on in the subpixel SP.

During the addressing step (S11), the emission control signal EM may have a turn-off level voltage. Accordingly, the third transistor T3 may be in a turn-off state. Since the third transistor T3 is turned off, the light emitting device ED may be in a state where the light emitting device cannot emit light. Accordingly, it is possible to prevent or at least reduce a light leakage phenomenon in the addressing step (S12).

Figure 5:
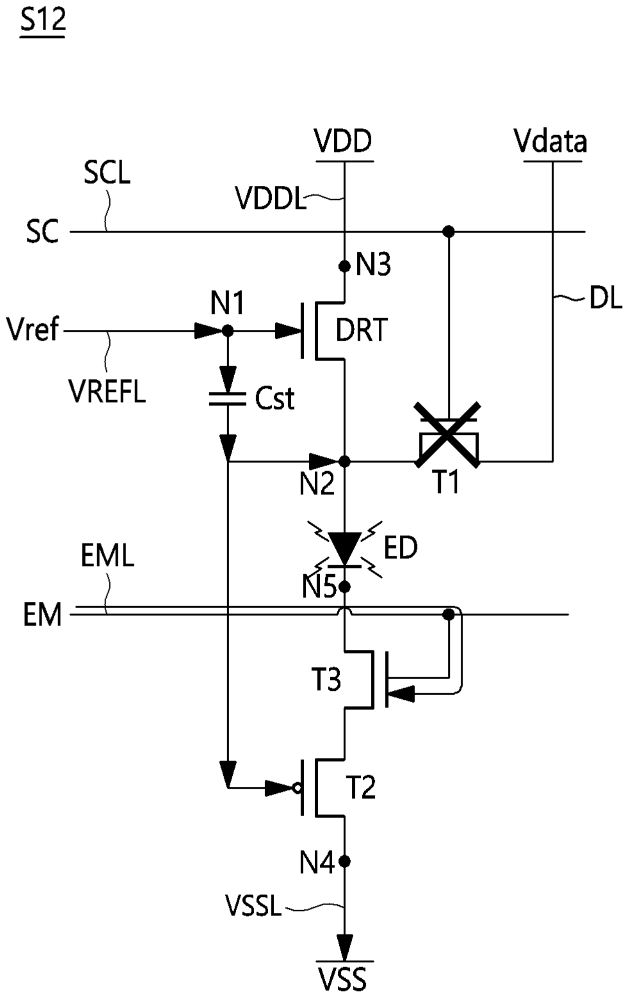
FIG. 5 illustrates an emission step in a subpixel driving method of a display device according to embodiments of the present disclosure.

FIG. 5 illustrates the emission step (S12) in the driving method of the subpixel SP in the display device 100 according to the embodiments of the present disclosure.

Referring to FIG. 5, during the emission step (S12), a reference voltage Vref that is the same as the constant reference voltage Vref applied during the addressing step (S11) may be applied to the reference voltage line VREFL. According to the capacitive coupling, the voltage of the second node N2 electrically connected to the other side of the storage capacitor may be maintained as the applied data voltage Vdata without change.

During the emission step (S12), the scan signal SC may have a turn-off level voltage. Accordingly, the first transistor T1 may be in a turn-off state. Since the first transistor T1 is in a turn-off state, the second node N2 may be in an electrically floating state. Regardless of the floating state, the voltage of the second node N2 may be maintained.

During the emission step (S12), as the voltage of the second node N2 is maintained, the threshold voltage fluctuation speed of the driving transistor DRT may be reduced. As the threshold voltage fluctuation speed of the driving transistor DRT is reduced, the lifespan reduction speed of the display device 100 may be reduced. A detailed description is exemplified in the descriptions of FIGS. 13 and 14.

During the emission step (S12), the emission control signal EM may have a turn-on level voltage. Accordingly, the third transistor T3 may be turned on. Since the third transistor T3 is turned on, current may be conducted from the fifth node N5 electrically connected to the second electrode CE of the light emitting device ED to the second transistor T2.

For convenience of explanation, a resistance of the third transistor T3 may be ignored, and it is assumed that the voltage of the fifth node N5 and the third transistor T3 are the same. However, this does not mean to exclude the situation where the resistance of the third transistor T3 exists, and the third transistor T3 may have a slight resistance component even when the third transistor is turned on.

During the emission step (S12), the resistance of the second transistor T2 may vary as the data voltage Vdata is applied from the second node N2 to the gate node of the second transistor T2.

During the emission step (S12), the second transistor T2 may be turned on as the data voltage Vdata is applied to the gate node of the second transistor T2. Accordingly, current may be conducted from the fifth node N5 to the fourth node N4. Depending on the data voltage Vdata applied to the gate node of the second transistor T2, the resistance of the second transistor T2 may be varied. The voltage states of the fourth node N4 and the fifth node N5 may be changed depending on a change in the resistance. Accordingly, the amount of current conducted to the light emitting device ED may be adjusted.

Hereinafter, it will be described another subpixel SP of the present disclosure for minimizing image quality deterioration due to the body effect phenomenon.

Figure 6:
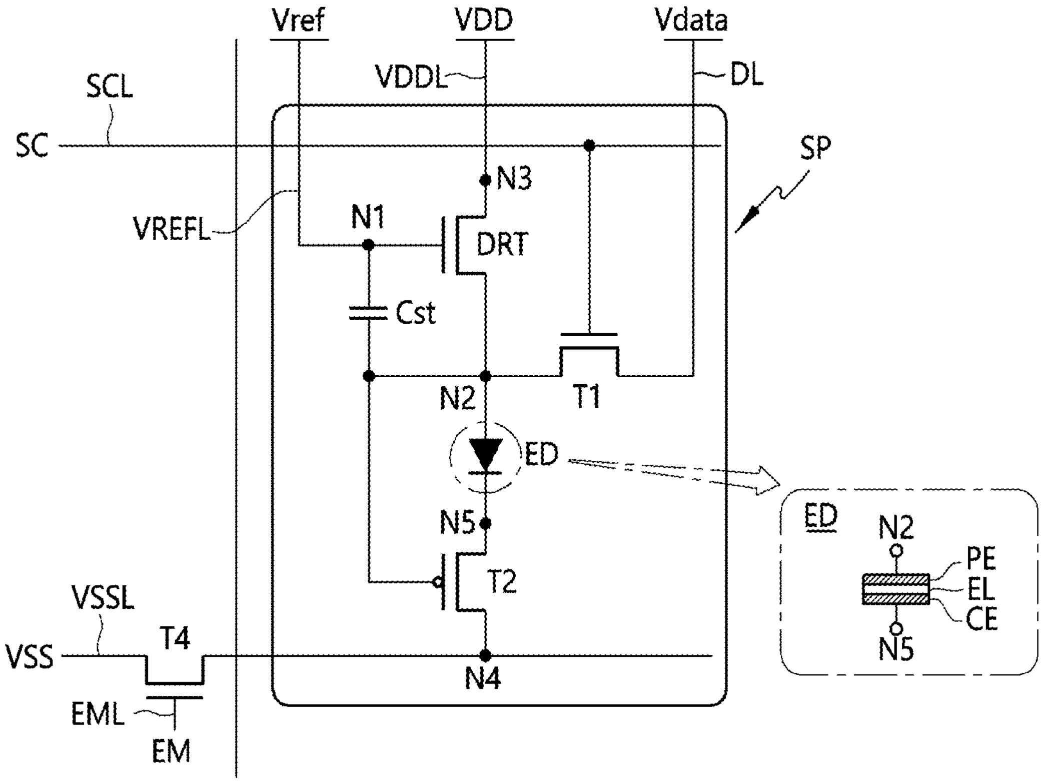
FIG. 6 illustrates another subpixel of a display device according to embodiments of the present disclosure.

FIG. 6 is another subpixel SP of the display device 100 according to embodiments of the present disclosure.

The connection relationship between the light emitting device ED, the driving transistor DRT, the first transistor T1, the storage capacitor Cst, the scan signal line SCL, the data line DL, the high-potential driving voltage line VDDL, and the reference voltage line VREFL of the subpixel SP of FIG. 6 is the same as that of the subpixel SP of FIG. 2. Therefore, the description of the same content as the connection relationship of FIG. 2 may be omitted.

Referring to FIG. 6, the drain node of the second transistor T2 may be connected to the fifth node N5 electrically connected to the second electrode CE of the light emitting device ED. The gate node of the second transistor T2 may be electrically connected to the second node N2. The source node of the second transistor T2 may be connected to the fourth node N4 corresponding to the drain node or source node of the fourth transistor T4. Hereinafter, for the convenience of explanation, it will be described a case in which the fourth node N4 is a drain node of the fourth transistor T4 as an example.

The fourth transistor T4 may be connected between the second transistor T2 and the low-potential driving voltage line VSSL. The gate node of the fourth transistor T4 may be electrically connected to the emission control signal line EML.

The driving transistor DRT, the first transistor T1, the second transistor T2, and the light emitting device ED may be included in the subpixel SP, and the fourth transistor T4 may be included in the gate driving circuit 130. The driving transistor DRT, the first transistor T1, the second transistor T2, and the light emitting device ED may be included in the display area DA, and the fourth transistor T4 may be included in the non-display area NDA. Accordingly, since each subpixel SP forms a 3T1C structure, it is possible to minimize or at least reduce the limitation of the arrangement method of components in the display device 100.

For example, if the subpixel SP forms a 4T1C structure, a surface-type resistor may be disposed within the panel 110 of the display device 100 to apply a low-potential driving voltage VSS. For example, if the subpixel SP forms a 3T1C structure, a low-potential driving voltage line VSSL for applying a low-potential driving voltage VSS within the display device 100 may be arranged to extend in the horizontal or vertical direction.

Hereinafter, it will be described a driving method for each driving period of another subpixel SP according to an embodiment of the present disclosure.

Figure 7:
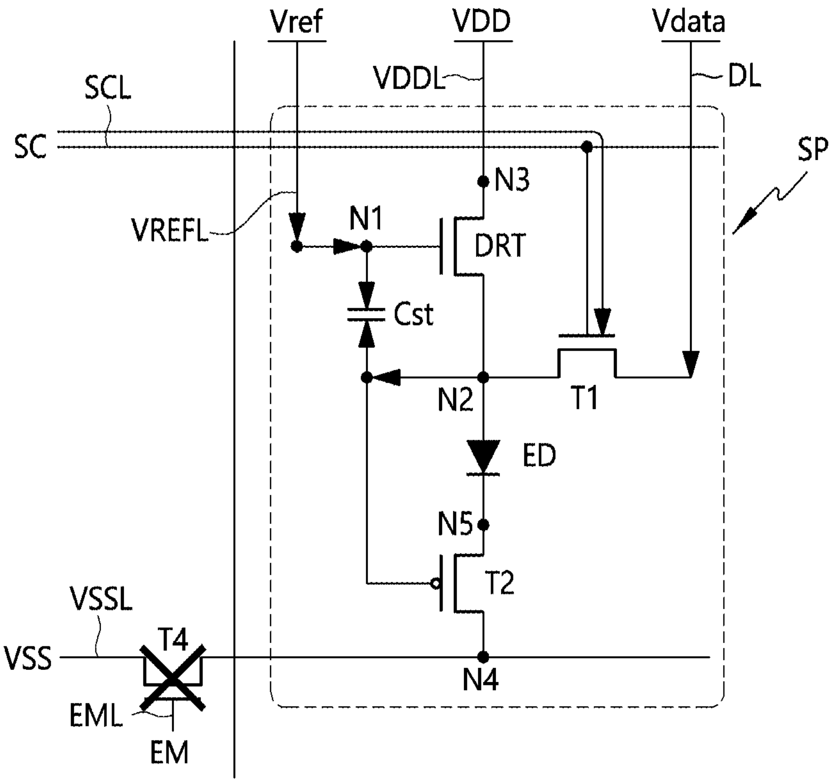
FIG. 7 illustrates an addressing step in a subpixel driving method of a display device according to embodiments of the present disclosure.

FIG. 7 illustrates an addressing step (S11) in another driving method of a subpixel SP of a display device 100 according to embodiments of the present disclosure.

The description of the same content as the driving method of FIG. 4 among another driving methods of the addressing step (S11) of the subpixel SP of FIG. 7 may be omitted.

Referring to FIG. 7, during the addressing step (S11), the emission control signal EM may have a turn-off level voltage. Accordingly, the fourth transistor T4 may be in a turn-off state. As the fourth transistor T4 is turned off, the light emitting device ED may be in a non-luminous state. Accordingly, the light leakage phenomenon in the addressing step (S12) may be prevented.

During the addressing step (S11), as the data voltage Vdata is applied to the second node N2 and the data voltage Vdata is applied to the gate node of the second transistor T2, the resistance of the second transistor T2 may be variable.

Figure 8:
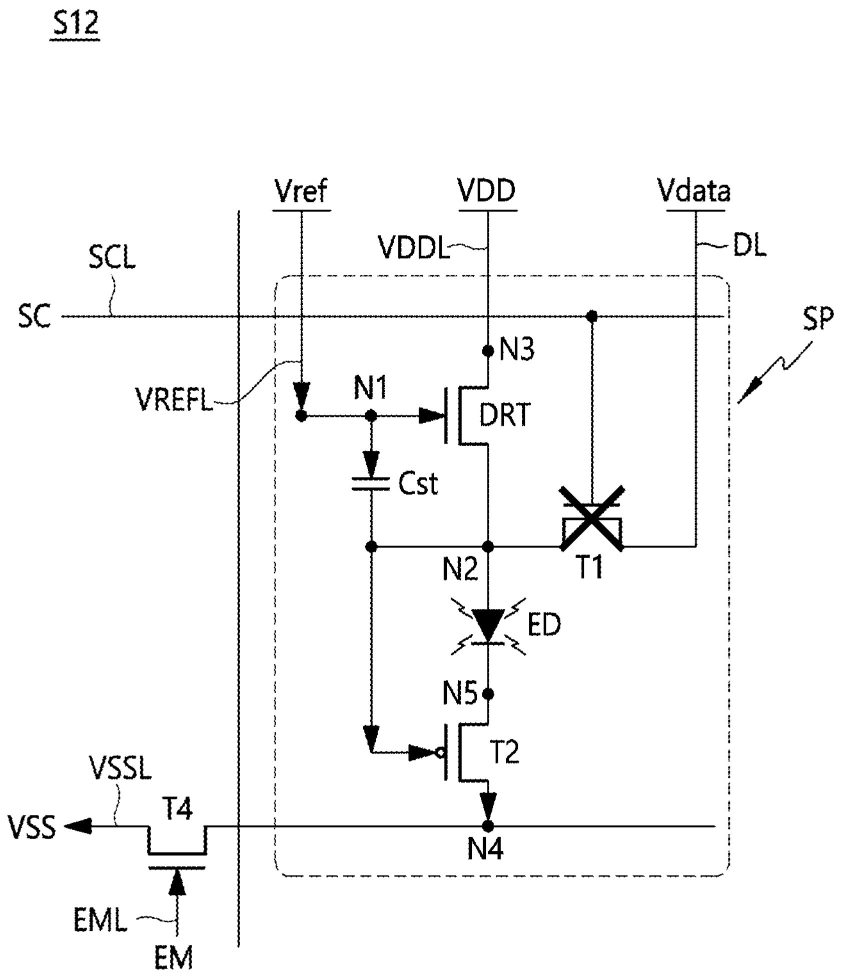
FIG. 8 illustrates an emission step in a subpixel driving method of a display device according to embodiments of the present disclosure.

FIG. 8 illustrates an emission step (S12) in another driving method of a subpixel SP of a display device 100 according to embodiments of the present disclosure.

Among another driving methods of the emission step (S12) of a subpixel SP of FIG. 8, a description of the same content as the driving method of FIG. 5 may be omitted.

During the emission step (S12), the second transistor T2 may be turned on as the data voltage Vdata is applied from the second node N2 to the gate node of the second transistor T2. Accordingly, current may be conducted from the fifth node N5 electrically connected to the second electrode CE of the light emitting device ED to the fourth node N4 corresponding to the source node of the second transistor T2.

Hereinafter, for convenience of explanation, it is assumed that the resistance of the fourth transistor T4 is zero as an example. This is not intended to exclude the situation where the resistance of the fourth transistor T4 exists, and the fourth transistor T4 may have a slight resistance component even when the fourth transistor is turned on.

For example, during the emission step (S12), the emission control signal EM may have a turn-on level voltage. Accordingly, the fourth transistor T4 may be turned on. As the fourth transistor T4 is turned on, current may be conducted from the fourth node N4 to the low-potential driving voltage line VSSL. In addition, from the addressing stage (S11) to the emission step (S12), a data voltage Vdata may be applied to the gate node of the second transistor T2. Since the data voltage Vdata is applied to the gate node of the second transistor T2, the resistance of the second transistor T2 may be varied. The voltage states of the fourth node N4 and the fifth node N5 may be changed depending on a change in the resistance of the second transistor T2. Accordingly, the amount of current flowing to the light emitting device ED may be adjusted.

Hereinafter, it will be described another subpixel SP of the present disclosure for minimizing image quality deterioration due to the body effect phenomenon.

Figure 9:
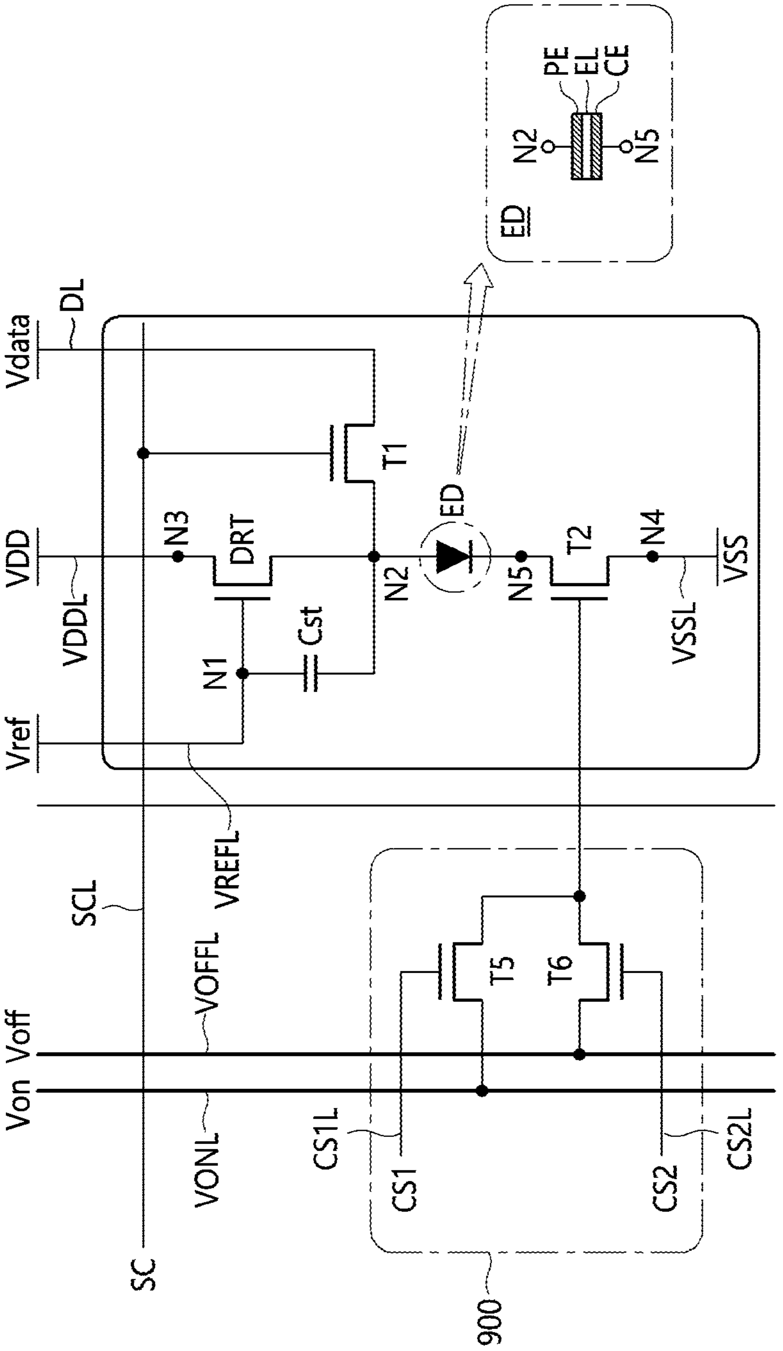
FIG. 9 illustrates another subpixel of a display device according to embodiments of the present disclosure.

FIG. 9 illustrates another subpixel SP of the display device 100 according to embodiments of the present disclosure.

The connection relationship between the light emitting device ED, the driving transistor DRT, the first transistor T1, the storage capacitor Cst, the scan signal line SCL, the data line DL, the high-potential driving voltage line VDDL, and the reference voltage line VREFL of the subpixel SP of FIG. 9 is the same as that of the subpixel SP of FIG. 2. Therefore, the description of the same content as the connection relationship of FIG. 2 may be omitted.

Referring to FIG. 9, the drain node of the second transistor T2 may be connected to the fifth node N5 electrically connected to the second electrode CE of the light emitting device ED. The gate node of the second transistor T2 may be electrically connected to a switching circuit 900.

The switching circuit 900 is a circuit for supplying one of a first voltage Von and a second voltage Voff that are different from each other to the gate node of the second transistor T2. The switching circuit 900 may include a fifth transistor T5 and a sixth transistor T6.

The fifth transistor T5 may be a transistor for supplying a first voltage Von to a gate node of a second transistor T2. A drain node or a source node of the fifth transistor T5 may be electrically connected to a first voltage line VONL. The source node or the drain node of the fifth transistor T5 may be electrically connected to a gate node of a second transistor T2. A gate node of the fifth transistor T5 may be electrically connected to a first control signal line CS1L for supplying a first control signal CS1.

The sixth transistor T6 may be a transistor for supplying a second voltage Voff to a gate node of the second transistor T2. A drain node or a source node of the sixth transistor T6 may be electrically connected to a second voltage line VOFFL. The source node or drain node of the sixth transistor T6 may be electrically connected to the gate node of the second transistor T2. A gate node of the sixth transistor T6 may be electrically connected to a second control signal line CS2L for supplying a second control signal CS2.

Depending on the first voltage Von and the second voltage Voff, the resistance or resistance component of the second transistor T2 may be varied. As the resistance or resistance component of the second transistor T2 is varied, the voltage states of the fifth node N5 and the fourth node N4 may be changed. As the voltage states of the fifth node N5 and the fourth node N4 are changed, the current amount or the emission amount of the light emitting device ED may be adjusted.

The driving transistor DRT, the first transistor T1, the second transistor T2, and the light emitting device ED may be included in the subpixel SP, and the switching circuit 900 may be included in the gate driving circuit 130. The driving transistor DRT, the first transistor T1, the second transistor T2, and the light emitting device ED may be included in the display area DA, and the switching circuit 900 may be included in the non-display area NDA. Accordingly, since each of the subpixels SP forms a 3T1C structure, it is possible to minimize or at least reduce the limitation of the arrangement method of the plurality of components in the display device 100.

For example, if the subpixel SP forms a 4T1C structure, a surface-type resistor may be arranged in the panel 110 of the display device 100 to apply a low-potential driving voltage VSS. For example, if the subpixel SP forms a 3T1C structure, a low-potential driving voltage line VSSL for applying a low-potential driving voltage VSS within the display device 100 may be arranged to extend in the horizontal or vertical direction.

Hereinafter, it will be described a driving method of another subpixel SP according to an embodiment of the present disclosure.

Figure 10:
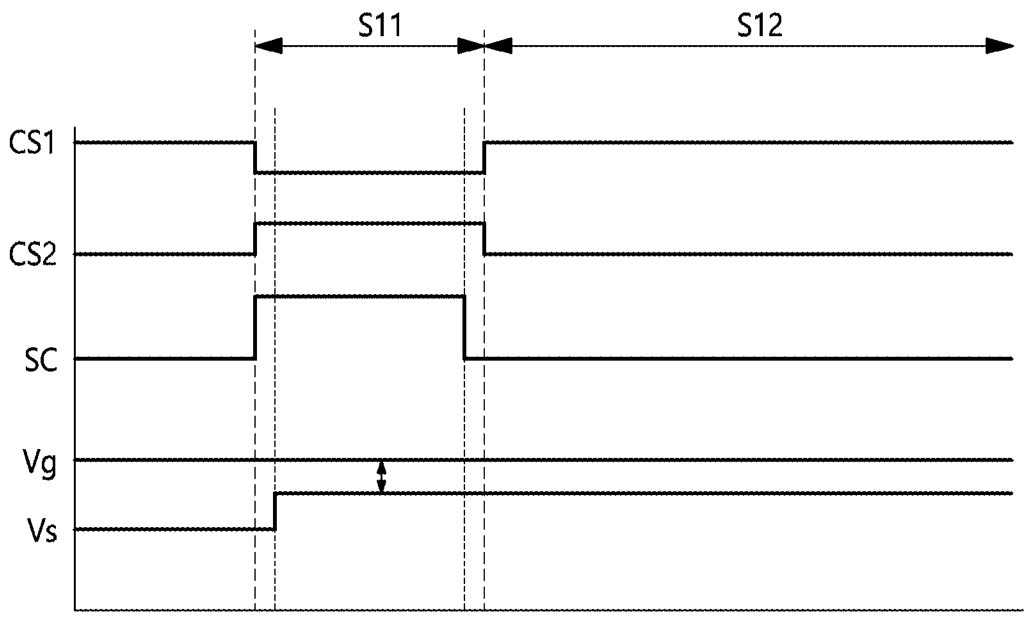
FIG. 10 is a timing diagram for driving a subpixel of a display device according to embodiments of the present disclosure.

FIG. 10 is a timing diagram for driving another subpixel SP of the display device 100 according to embodiments of the present disclosure.

Referring to FIG. 10, according to the driving method of the display device 100 according to the embodiments of the present disclosure, each driving period of another subpixel SP may include an addressing step (S11) and an emission step (S12). The addressing step (S11) may be referred to as a first driving period. The emission step (S12) may be referred to as a second driving period.

In the display device 100 according to the embodiments of the present disclosure, during the addressing step (S11), the first control signal CS1 applied to the first control signal line CS1L may have a turn-off level voltage. During the addressing step (S11), the second control signal SC2 applied to the second control signal line CS2L may have a turn-on level voltage.

During the addressing step (S11), the scan signal SC applied to the scan signal line SCL may have a turn-on level voltage. The scan signal SC may change from a turn-on level voltage to a turn-off level voltage after the point in time when the source voltage Vs of the source node of the driving transistor DRT becomes equal to the data voltage Vdata.

During the addressing step (S11), the gate voltage Vg of the gate node of the driving transistor DRT may be equal to a constant reference voltage Vref applied to the reference voltage line VREFL. During the addressing step (S11), the source voltage Vs of the source node of the driving transistor DRT may be changed to is applied to the data line DL and may be changed to the data voltage VDATA applied to the data line DL and corresponding to the image signal.

During the addressing step (S11), the state of the image (e.g., grayscale) can be determined by a difference between the gate voltage Vg of the gate node of the driving transistor DRT and the source voltage Vs of the source node of the driving transistor DRT.

During the emission step (S12), the first control signal CS1 applied to the first control signal line CS1L may have a turn-on level voltage. During the emission step (S12), the second control signal SC2 applied to the second control signal line CS2L may have a turn-off level voltage.

During the emission step (S12), the scan signal SC applied to the scan signal line SCL may have a turn-off level voltage.

During the emission step (S12), a constant reference voltage Vref may be applied to the gate node of the driving transistor DRT by the reference voltage line VREFL. For example, the gate voltage Vg of the gate node of the driving transistor DRT may be the same as the reference voltage Vref applied during the addressing step (S11).

During the emission step (S12), the source voltage Vs of the source node of the driving transistor DRT may be the same as the data voltage Vdata corresponding to the image signal applied to the data line DL during the addressing step (S11). For example, during the emission step (S12), the voltage of the second node N2 may be maintained for one frame.

Hereinafter, it will be described a driving method for each driving period of a subpixel SP according to an embodiment of the present disclosure.

Figure 11:
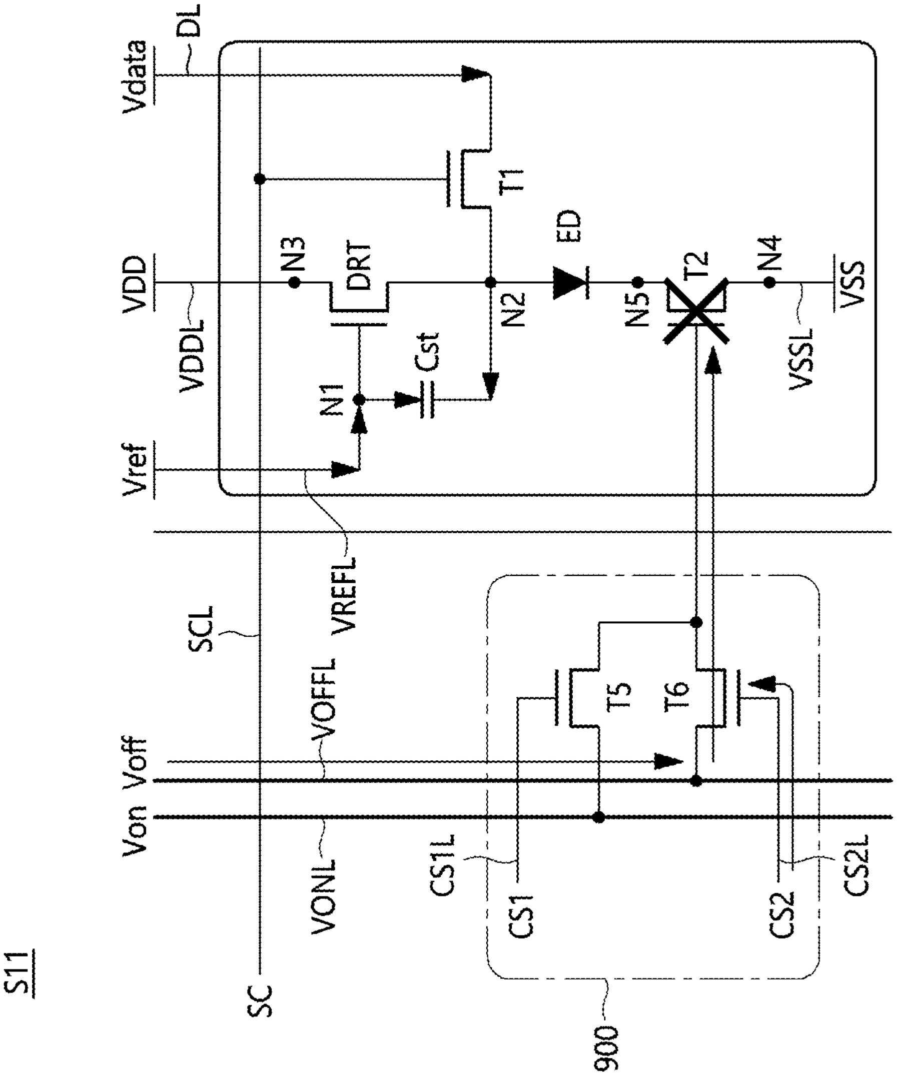
FIG. 11 illustrates an addressing step in another subpixel driving method of a display device according to embodiments of the present disclosure.

FIG. 11 illustrates an addressing step (S11) in a driving method of another subpixel SP in a display device 100 according to embodiments of the present disclosure.

Among the driving methods of the addressing step (S11) of another subpixel SP of FIG. 11, a description of the same content as the driving methods of FIG. 4 and FIG. 7 may be omitted.

During the addressing step (S11), the fifth transistor T5 may be in a turn-off state since the first control signal CS1 of the turn-off level voltage is applied to the gate node of the fifth transistor T5 by the first control signal line CS1L. The sixth transistor T6 may be in a turn-on state since the second control signal CS2 of the turn-on level voltage is applied to the sixth transistor T6 by the second control signal line CS2L.

As the sixth transistor T6 is turned on, a second voltage Voff may be applied to the gate node of the second transistor T2. As the second voltage Voff for turning off the second transistor T2 is applied to the gate node of the second transistor T2, the second transistor T2 may be turned off. Accordingly, the light emitting device ED may not emit light. Accordingly, the light leakage phenomenon of the addressing step (S11) may be prevented.

Figure 12:
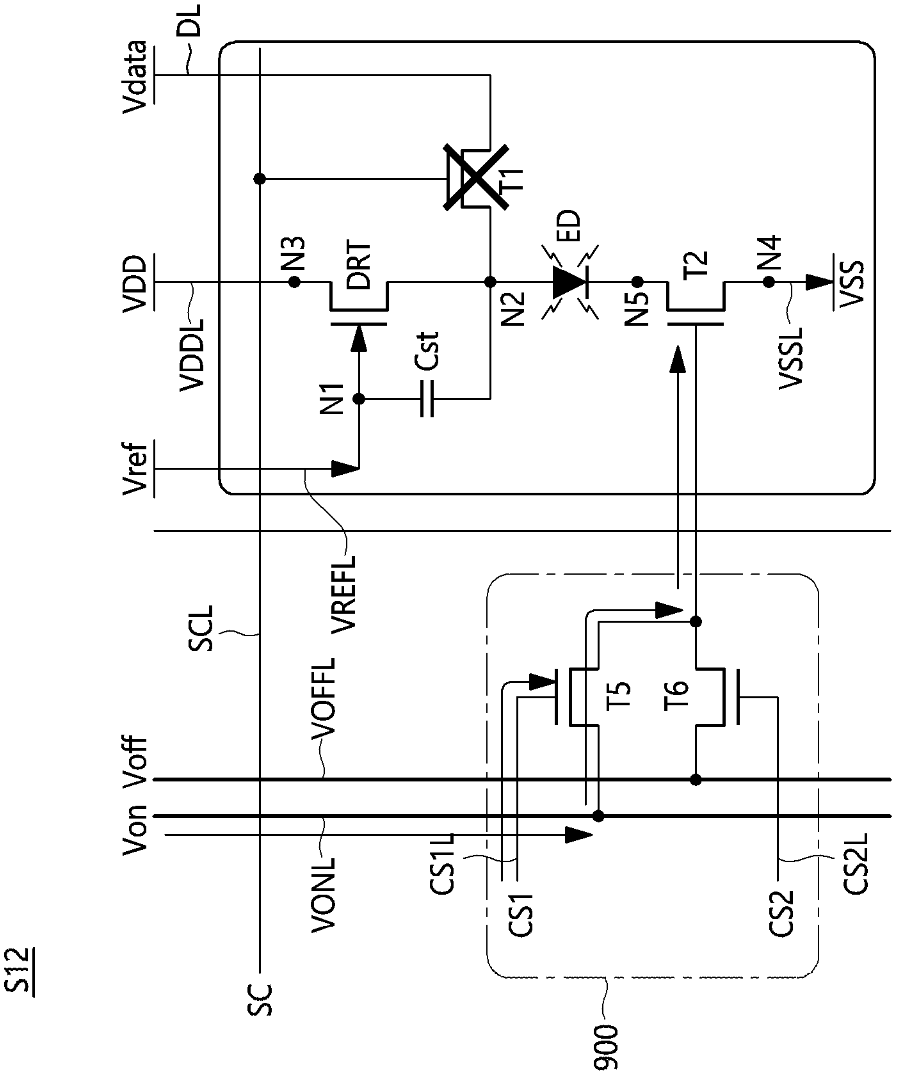
FIG. 12 illustrates an emission step in another subpixel driving method of a display device according to embodiments of the present disclosure.

FIG. 12 illustrates an emission step (S12) in a driving method of another subpixel SP in the display device 100 according to embodiments of the present disclosure.

Among the driving methods of the emission step (S12) of another subpixel SP of FIG. 12, a description of the same content as the driving methods of FIG. 5 and FIG. 8 may be omitted.

During the emission step (S12), since a first control signal CS1 of a turn-on level voltage is applied to a gate node of a fifth transistor T5 by a first control signal line CS1L, the fifth transistor T5 may be turned on. Since a second control signal CS2 of a turn-off level voltage is applied to a gate node of a sixth transistor T6 by a second control signal line CS2L, the sixth transistor T6 may be turned off. Since the fifth transistor T5 is turned on, a first voltage Von may be applied to a gate node of a second transistor T2. As a first voltage Von for changing the second transistor T2 to a turn-on state is applied to the gate node of the second transistor T2, the second transistor T2 may be turned on. Accordingly, current can be conducted from the fifth node N5 to the low-potential driving voltage line VSSL of the second transistor T2. In addition, the resistance of the second transistor T2 can be varied according to the first voltage Von. Depending on the varied resistance of the second transistor T2, the voltage states of the fourth node N4 and the fifth node N5 may be changed. As the voltage states of the fourth node N4 and the fifth node N5 are changed, the amount of current conducted to the light emitting device ED can be changed.

Hereinafter, it will be described the states of the driving transistor DRT and the light emitting device ED according to the use of the subpixel SP according to the present disclosure.

Figure 13:
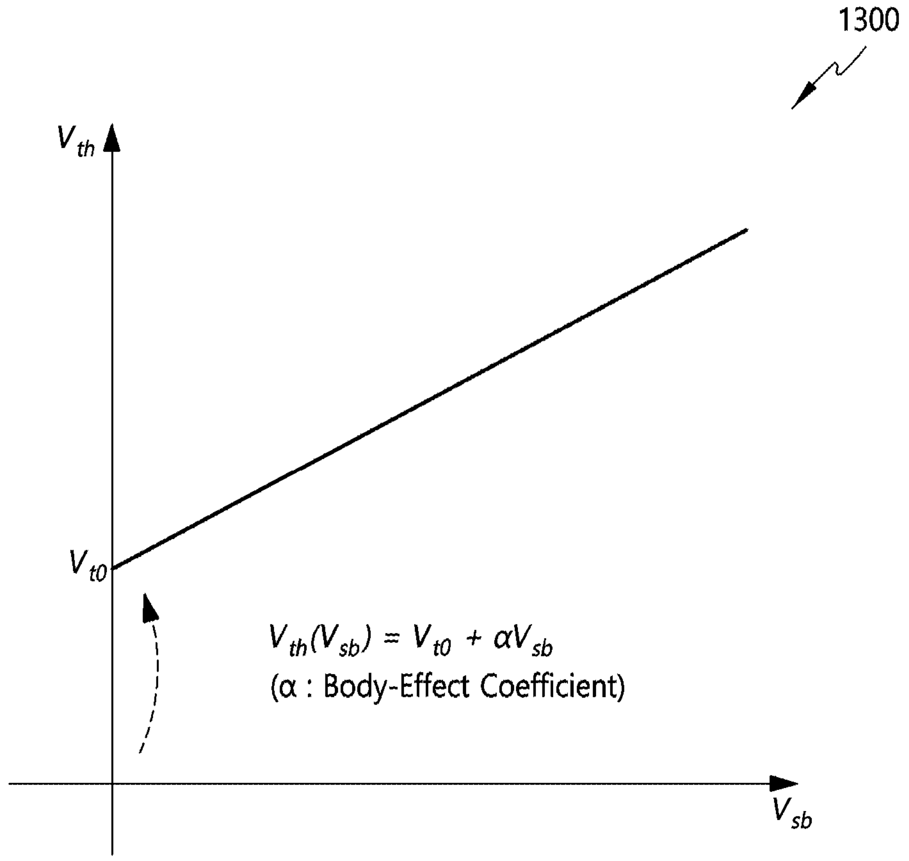
FIG. 13 illustrates a graph for explaining a threshold voltage change of a driving transistor according to embodiments of the present disclosure.

FIG. 13 illustrates a graph 1300 for explaining a change in the threshold voltage according to embodiments of the present disclosure.

The horizontal axis of the graph 1300 may represent a difference between the source voltage Vs of the source node of the driving transistor DRT and a voltage Vb of a body (or bulk or backplane) of the driving transistor DRT.

The vertical axis of the graph may represent the threshold voltage Vth of the driving transistor DRT.

In the light emitting device ED included in the subpixel SP, a coupling position of electrons and holes within the light emitting device ED may be changed as the lifespan of the light emitting device ED increases. As the coupling position changes, the coupling probability of electrons and holes may decrease. As the coupling probability decreases, the current required for the light emitting device ED to emit light may increase. As the current required for emission increases, the source voltage Vs of the source node of the driving transistor DRT required for emission may increase.

As the source voltage Vs increases, the difference between the source voltage Vs and the body voltage Vb may increase. The difference between the source voltage Vs and the body voltage Vb may be proportional to the threshold voltage Vth of the driving transistor DRT. As the voltage difference between the source voltage Vs and the body voltage Vb increases, the threshold voltage Vth of the driving transistor DRT may increase compared to the initial threshold voltage Vt0 of the driving transistor DRT. The phenomenon of increasing the threshold voltage Vth of the driving transistor DRT may be referred to as a body effect phenomenon. The body effect phenomenon may occur or be accelerated if the body of the driving transistor DRT is formed of silicon. However, according to embodiments of the present disclosure, within an image signal having the same grayscale, the source voltage Vs may be maintained regardless of the variation of the threshold voltage Vth.

Figure 14:
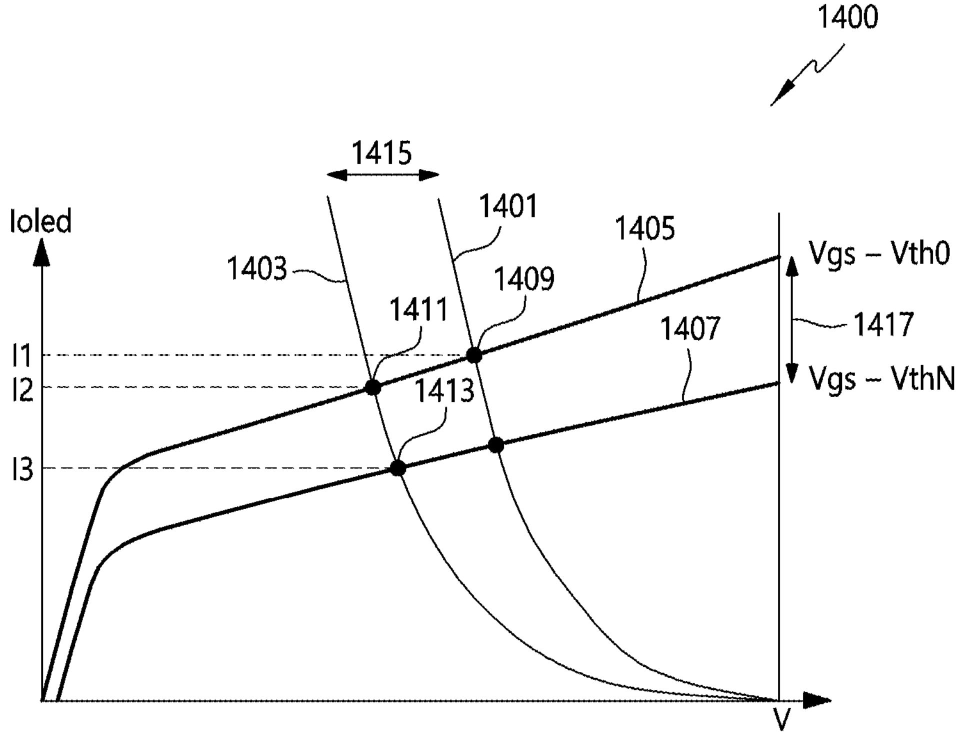
FIG. 14 illustrates another graph for explaining a state of a driving transistor and a light emitting device according to embodiments of the present disclosure.

FIG. 14 illustrates another graph 1400 for explaining the state of the driving transistor DRT and the light emitting device ED according to embodiments of the present disclosure.

The horizontal axis of another graph 1400 may represent the difference between the gate voltage Vg of the gate node of the driving transistor DRT and the source voltage Vs of the source node of the driving transistor DRT. The horizontal axis of the other graph 1400 may represent the difference between the drain voltage of the drain node of the driving transistor DRT and the source voltage Vs of the source node of the driving transistor DRT on the left side based on the operating point (e.g., a first operating point 1409, a second operating point 1411, a third operating point 1413), and may represent the voltage of the light emitting device ED on the right side based on the operating point.

The vertical axis of the other graph 1400 may represent the amount of current (Ioled) required to drive the light emitting device ED.

A first light emitting device curve 1401 may represent a curve before the light emitting device ED deteriorates. A second light emitting device curve 1403 may represent a curve after the light emitting device ED is deteriorated.

A first transistor curve 1405 may represent a curve before the threshold voltage Vth of the driving transistor DRT rises. A second transistor curve 1407 may represent a curve after the threshold voltage Vth of the driving transistor DRT rises. The first transistor curve 1405 may represent a curve before the body effect phenomenon of the driving transistor DRT occurs. The second transistor curve 1407 may represent a curve after the body effect phenomenon occurs.

The first operating point 1409 may represent a state of voltage and current at which the light emitting device ED operates in the case that a light emitting device ED corresponding to the first light emitting device curve 1401 and a driving transistor DRT corresponding to the first transistor curve 1405 are used.

The second operating point 1411 may indicate the voltage and current state at which the light emitting device ED operates in the case that a light emitting device ED corresponding to the second light emitting device curve 1403 and a driving transistor DRT corresponding to the first transistor curve 1405 are used.

The third operating point 1413 may indicate the voltage and current state at which the light emitting device ED operates in the case that a light emitting device ED corresponding to the second light emitting device curve 1403 and a driving transistor DRT corresponding to the second transistor curve 1407 are used.

The amount of current required to drive the light emitting device ED at the first operating point 1409 may be a first current I1. As the light emitting device ED deteriorates at the first operating point 1409, the operating point of the light emitting device ED may change to the second operating point 1411. Accordingly, the amount of current required to drive the light emitting device ED may change to a second current I2. In the absence of the body effect phenomenon of the driving transistor DRT, the difference in the amount of current required to drive the light emitting device ED due to the deterioration of the light emitting device ED may be the difference between the first current I1 and the second current I2. As the amount of current required to drive the light emitting device ED decreases, the brightness of the display device 100 may decrease.

As the deterioration of the light emitting device ED and the body effect phenomenon of the driving transistor DRT occur at the first operating point 1409, the operating point of the light emitting device ED may change to the third operating point 1413. Accordingly, the amount of current required to drive the light emitting device ED may change to a third current I3.

In the event of deterioration of the light emitting device ED, the amount of change in the current required to drive the light emitting device ED may be the difference between the first current I1 and the second current I2. In the event of deterioration of the light emitting device ED and the occurrence of the body effect phenomenon, the amount of change in the current required to drive the light emitting device ED may be the difference value between the first current I1 and the third current I3. The amount of change in the current required to drive the light emitting device ED may be inversely proportional to a luminance lifespan of the display device 100. The difference value between the first current I1 and the third current I3 may be greater than the difference value between the first current I1 and the second current I2. Since the amount of change in the current required to drive is inversely proportional to the luminance lifespan of the display device 100, the rate of decrease in the luminance lifespan of the display device 100 may increase due to the occurrence of the body effect phenomenon.

As the light emitting device ED deteriorates in the description of FIG. 13, the voltage required for the light emitting device ED to emit light may increase. Accordingly, the source voltage Vs required for the light emitting device ED to emit light may increase. A first gap 1415 between the first light emitting device curve 1401 and the second light emitting device curve 1403 may be proportional to the amount of change in the source voltage Vs of the driving transistor DRT. Therefore, by applying a reference voltage Vref to one side of the storage capacitor Cst and applying a data voltage Vref to the other side of the storage capacitor Cst, the subpixel SP may be configured so that the source voltage Vs of the same driving transistor DRT is maintained within the frame time in which the image signal of the same grayscale is displayed. Accordingly, it is possible to minimize the amount of change in the source voltage Vs within the frame time in which the image signal of the same grayscale is displayed. As the amount of change in the source voltage Vs is minimized, the first gap 1415 may be minimized or at least reduced.

The threshold voltage Vth of the driving transistor DRT may be proportional to the source voltage Vs of the driving transistor DRT. Accordingly, a second gap 1417 between the first transistor curve 1405 and the second transistor curve 1407 may be proportional to the amount of change in the source voltage Vs of the source node of the driving transistor DRT.

In the subpixels SP according to the embodiment of the present disclosure, during the emission step (S12) of the driving transistor DRT, the source voltage Vs of the source node of the driving transistor DRT may be maintained since a voltage across the storage capacitor Cst is maintained and the reference voltage Vref is supplied from the reference voltage line VREFL. As the source voltage Vs is maintained and the source voltage Vs is proportional to the threshold voltage Vth, it is possible to minimize or at least reduce the difference between an initial threshold voltage Vth0 and a deteriorated threshold voltage VthN changed over time. As the difference between the initial threshold voltage Vth0 and the deterioration threshold voltage VthN changed over time is minimized, the first gap 1415 can be reduced. As the difference between the initial threshold voltage Vth0 and the deterioration threshold voltage VthN changed over time is minimized, the difference between the first transistor curve 1405 and the second transistor curve 1407 can be minimized. Accordingly, the second gap 1417 can be reduced.

As the first gap 1415 and the second gap 1417 are reduced, the change in the operating point of the light emitting device ED can be reduced. Accordingly, the change in the amount of current required to drive the light emitting device ED can be reduced.

Since the change in the amount of current required to drive the light emitting device ED is reduced, it is possible to increase the luminance life of the display device 100.

Embodiments of the present disclosure described above are briefly described as follow.

A display device according to embodiments of the present disclosure may include a subpixel that emits light based on data voltage.

The subpixel may include a light emitting device including a first electrode, an intermediate layer, and a second electrode, a driving transistor controlling a connection between a second node and a third node according to a voltage applied to a first node, a first transistor controlling a connection between the second node and a data line supplied with the data voltage according to a scan signal applied to a first gate node, a storage capacitor electrically connected between the first node and the second node, and a second transistor connected between a fourth node and the second electrode, and turned on or off according to a gate voltage applied to a second gate node.

A voltage of the second node may be maintained while the light emitting device emits light.

The first node may be electrically connected to a reference voltage line.

A reference voltage may be supplied to the first node from the reference voltage line.

A resistance of the second transistor may vary depending on the gate voltage applied to the second gate node.

An emission of the light emitting device may be controlled as a voltage of a fifth node electrically connected to the second electrode changes.

The second gate node may be electrically connected to the second node.

The second transistor may be turned on or off depending on a voltage of the second node.

The subpixel may further include a third transistor connected between the light emitting device and the second transistor and controlling a connection between the second electrode and the second transistor according to an emission control signal.

During a first driving period of the subpixel, the scan signal having a turn-on level voltage may be supplied to the first gate node, and the emission control signal having a turn-off level voltage may be supplied to a third gate node of the third transistor.

During a second driving period of the subpixel, the scan signal having a turn-off level voltage may be supplied to the first gate node, and the emission control signal having a turn-on level voltage may be supplied to the third gate node of the third transistor.

The display device may further include a gate driving circuit supplying the scan signal.

The gate driving circuit may further include a fourth transistor connected between the second transistor and a driving voltage line and controlling a connection between the second transistor and the driving voltage line according to an emission control signal.

During a first driving period of the subpixel, the scan signal having a turn-on level voltage may be supplied to the first gate node, and the emission control signal having a turn-off level voltage may be supplied to a fourth gate node of the fourth transistor.

During a second driving period of the subpixel, the scan signal having a turn-off level voltage may be supplied to the first gate node, and the emission control signal having a turn-on level voltage may be supplied to the fourth gate node of the fourth transistor.

The driving transistor, the first transistor, and the second transistor may be disposed in a display area where an image is displayed.

The fourth transistor may be disposed in a non-display area where an image is not displayed.

The display device may further include a switching circuit for supplying one of a first voltage and a second voltage different from each other to the second gate node of the second transistor.

The switching circuit may include a fifth transistor controlling a connection between a first voltage line for supplying the first voltage and the second gate node of the second transistor, and a sixth transistor controlling a connection between a second voltage line for supplying the second voltage and the second gate node of the second transistor.

The display device may further include a gate driving circuit for supplying the scan signal.

The fifth transistor and the sixth transistor may be located within the gate driving circuit.

The fifth transistor and the sixth transistor may be disposed in a non-display area where an image is not displayed.

During a first driving period of the subpixel, a first control signal of a turn-off level voltage may be supplied to a fifth gate node of the fifth transistor, a second control signal of a turn-on level voltage may be supplied to a sixth gate node of the sixth transistor.

During a second driving period of the subpixel, a first control signal of a turn-on level voltage may be supplied to the fifth gate node of the fifth transistor, and a second control signal of a turn-off level voltage may be supplied to the sixth gate node of the sixth transistor.

During a first driving period of the subpixel, the scan signal of a turn-on level voltage may be supplied to the first gate node.

During a second driving period of the subpixel, the scan signal of a turn-off level voltage may be supplied to the first gate node.

A subpixel according to embodiments of the present disclosure may include a light emitting device including a first electrode, an intermediate layer, and a second electrode, a driving transistor controlling a connection between a second node and a third node according to a voltage applied to a first node, a first transistor controlling a connection between a data line to which the data voltage is provided and the second node according to a scan signal applied to a first gate node, a storage capacitor electrically connected between the first node and the second node, and a second transistor connected between a fourth node and the second electrode, and turned on or off according to a gate voltage applied to a second gate node.

According to embodiments of the present disclosure as described above, it is possible to provide a subpixel and a display device capable of controlling the voltage state of a second electrode of a light emitting device.

According to embodiments of the present disclosure, it is possible to provide a subpixel and a display device capable of preventing image quality degradation due to a change in the characteristics of a driving transistor (e.g. threshold voltage, mobility, etc.).

According to embodiments of the present disclosure, it is possible to provide a subpixel and a display device capable of minimizing the degradation of image quality due to body effect phenomenon in a driving transistor.

According to embodiments of the present disclosure, it is possible to provide a subpixel and a display device capable of supplying a reference voltage to a gate node of a driving transistor and a data voltage to a source node of the driving transistor.

According to embodiments of the present disclosure, it is possible to provide a subpixel and a display device capable of maintaining the voltage at a source node of a driving transistor while emitting light, thereby controlling the body effect phenomenon.

According to embodiments of the present disclosure, it is possible to effectively drive a subpixel with low power consumption by effectively controlling the body effect phenomenon in a driving transistor.

The above description has been presented to enable any person skilled in the art to make and use the technical idea of the present invention and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention.

What is claimed is:

1. A display device, comprising:

a subpixel that emits light based on a data voltage, the subpixel comprising:

a light emitting device including a first electrode, an intermediate layer, and a second electrode;

a driving transistor configured to control a connection between a second node electrically connected to the light emitting device and a third node electrically connected to a high-potential driving voltage line that supplies a high-potential driving voltage according to a voltage applied to a first node electrically connected to a reference voltage line that supplies a reference voltage;

a first transistor configured to control a connection between the second node and a data line supplied with the data voltage to the second node according to a scan signal applied to a first gate node;

a storage capacitor electrically connected to the first node and the second node; and a second transistor connected to a fourth node electrically connected to a low-potential driving voltage line that supplies a low-potential driving voltage and the light emitting device, the second transistor turned on or off according to a gate voltage applied to a second gate node.

2. The display device of claim 1, wherein a voltage of the second node is maintained while the light emitting device emits light.

3. The display device of claim 1, wherein the first node is electrically connected to a reference voltage line and a reference voltage is supplied to the first node from the reference voltage line.

4. The display device of claim 1, wherein a resistance of the second transistor varies depending on the gate voltage applied to the second gate node.

5. The display device of claim 4, wherein an emission of the light emitting device is controlled as a voltage of a fifth node that is electrically connected to the second electrode changes.

6. The display device of claim 1, wherein the second gate node is electrically connected to the second node and the second transistor is turned on or off depending on a voltage of the second node.

7. The display device of claim 1, wherein the subpixel further comprises:

a third transistor connected to the light emitting device and the second transistor, the third transistor configured to control a connection between the second electrode and the second transistor according to an emission control signal.

8. The display device of claim 7, wherein during a first driving period of the subpixel, the scan signal having a turn-on level voltage is supplied to the first gate node and the emission control signal having a turn-off level voltage is supplied to a third gate node of the third transistor, wherein during a second driving period of the subpixel, the scan signal having a turn-off level voltage is supplied to the first gate node and the emission control signal having a turn-on level voltage is supplied to the third gate node of the third transistor.

9. The display device of claim 1, further comprising:

a gate driving circuit configured to supply the scan signal, wherein the gate driving circuit comprises a fourth transistor connected to the second transistor and a driving voltage line, and configured to control a connection between the second transistor and the driving voltage line according to an emission control signal.

10. The display device of claim 9, wherein during a first driving period of the subpixel, the scan signal having a turn-on level voltage is supplied to the first gate node and the emission control signal having a turn-off level voltage is supplied to a fourth gate node of the fourth transistor, wherein during a second driving period of the subpixel, the scan signal having a turn-off level voltage is supplied to the first gate node and the emission control signal having a turn-on level voltage is supplied to the fourth gate node of the fourth transistor.

11. The display device of claim 9, wherein the driving transistor, the first transistor, and the second transistor are in a display area where an image is displayed, and the fourth transistor is in a non-display area where the image is not displayed.

12. The display device of claim 1, further comprising:

a switching circuit configured to supply one of a first voltage and a second voltage that are different from each other to the second gate node of the second transistor.

13. The display device of claim 12, wherein the switching circuit includes:

a fifth transistor configured to control a connection between a first voltage line that supplies the first voltage and the second gate node of the second transistor; and a sixth transistor configured to control a connection between a second voltage line that supplies the second voltage and the second gate node of the second transistor.

14. The display device of claim 13, further comprising:

a gate driving circuit configured to supply the scan signal, wherein the fifth transistor and the sixth transistor are located within the gate driving circuit.

15. The display device of claim 13, wherein the fifth transistor and the sixth transistor are in a non-display area where an image is not displayed.

16. The display device of claim 15, wherein during a first driving period of the subpixel, a first control signal of a turn-off level voltage is supplied to a fifth gate node of the fifth transistor and a second control signal of a turn-on level voltage is supplied to a sixth gate node of the sixth transistor, wherein during a second driving period of the subpixel, a first control signal of a turn-on level voltage is supplied to the fifth gate node of the fifth transistor and a second control signal of a turn-off level voltage is supplied to the sixth gate node of the sixth transistor.

17. The display device of claim 14, wherein during a first driving period of the subpixel, the scan signal of a turn-on level voltage is supplied to the first gate node, wherein during a second driving period of the subpixel, the scan signal of a turn-off level voltage is supplied to the first gate node.

18. A subpixel, comprising:

a light emitting device including a first electrode, an intermediate layer, and a second electrode;

a driving transistor configured to control a connection between a second node electrically connected to the light emitting device and a third node electrically connected to a high-potential driving voltage line that supplies a high-potential driving voltage according to a voltage applied to a first node electrically connected to a reference voltage line that supplies a reference voltage;

a first transistor configured to control a connection between a data line to which a data voltage to the second node is provided and the second node according to a scan signal applied to a first gate node;

a storage capacitor electrically connected to the first node and the second node; and a second transistor connected to a fourth node electrically connected to a low-potential driving voltage line that supplies a low-potential driving voltage and the light emitting device, the second transistor turned on or off according to a gate voltage applied to a second gate node.

* * * * *